United States Patent
Zhang et al.

(10) Patent No.: US 12,437,876 B2
(45) Date of Patent: Oct. 7, 2025

(54) DISEASE PREDICTION SYSTEM AND APPARATUS BASED ON MULTI-RELATION FUNCTIONAL CONNECTIVITY MATRIX

(71) Applicant: ZHEJIANG LAB, Hangzhou (CN)

(72) Inventors: Yu Zhang, Hangzhou (CN); Jun Li, Hangzhou (CN); Chaoliang Sun, Hangzhou (CN); Huan Zhang, Hangzhou (CN); Zhichao Wang, Hangzhou (CN); Jingsong Li, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 383 days.

(21) Appl. No.: 18/129,754

(22) Filed: Mar. 31, 2023

(65) Prior Publication Data

US 2023/0290514 A1     Sep. 14, 2023

Related U.S. Application Data

(63) Continuation of application No. PCT/CN2022/113907, filed on Aug. 22, 2022.

(30) Foreign Application Priority Data

Mar. 8, 2022 (CN) .......................... 202210218603.3

(51) Int. Cl.
    *G16H 50/30*          (2018.01)
    *G06F 17/16*          (2006.01)
    (Continued)

(52) U.S. Cl.
    CPC ............ *G16H 50/30* (2018.01); *G06F 17/16* (2013.01); *G06T 7/0012* (2013.01); *G06V 10/62* (2022.01);
    (Continued)

(58) Field of Classification Search
None
See application file for complete search history.

(56) References Cited

U.S. PATENT DOCUMENTS

2021/0041953 A1    2/2021   Poltorak
2021/0401289 A1* 12/2021   Yamashita .......... G06F 18/2136

FOREIGN PATENT DOCUMENTS

CN       107256332 A     10/2017
CN       107658018 A      2/2018
(Continued)

OTHER PUBLICATIONS

Du Yuhang. "Analysis and classification of changes in brain functional connections in patients with Alzheimer''s disease." A thesis for master's degree. Hebei University. Aug. 15, 2020. DOI: 10.27103/d.cnki.ghebu.2020.000910.

R ge, Rasmus, et al. "Whole brain functional connectivity predicted by indirect structural connections." 2017 International Workshop on Pattern Recognition in Neuroimaging (PRNI). IEEE, 2017.

*Primary Examiner* — Sean Shechtman
(74) *Attorney, Agent, or Firm* — IPro, PLLC

(57) ABSTRACT

Disclosed are a disease prediction method, system and apparatus based on a multi-relation functional connectivity matrix. A Pearson correlation coefficient matrix and a DTW distance matrix are respectively calculated according to resting state functional magnetic resonance time series extracted from a brain atlas, the DTW distance matrix is converted in combination with the Pearson correlation coefficient matrix into a DTW' matrix which includes correlation degree and correlation direction information and whose numerical range is equivalent to the value range of a Pearson coefficient, and a functional connectivity matrix is obtained after weighted combination. The present disclosure combines DTW distance information to weaken the dynamic change of functional connectivity and the influence of asynchrony of functional signals in different brain regions on the functional connectivity matrix, so that the calculated (Continued)

functional connectivity matrix can better reflect the correlation between the functional signals in different brain regions.

5 Claims, 4 Drawing Sheets

(51) Int. Cl.
 *G06T 7/00* (2017.01)
 *G06V 10/62* (2022.01)
(52) U.S. Cl.
 CPC .............. *G06T 2207/10088* (2013.01); *G06T 2207/30016* (2013.01)

(56) References Cited

FOREIGN PATENT DOCUMENTS

| | | | |
|---|---|---|---|
| CN | 108596228 | A | 9/2018 |
| CN | 109192298 | A | 1/2019 |
| CN | 109330595 | A | 2/2019 |
| CN | 110097968 | A | 8/2019 |
| CN | 111241683 | A | 6/2020 |
| CN | 111583181 | A | 8/2020 |
| CN | 111863244 | A | 10/2020 |
| CN | 114334140 | A | 4/2022 |
| KR | 20120050379 | A | 5/2012 |
| WO | 2020075737 | A1 | 4/2020 |
| WO | 2021212715 | A1 | 10/2021 |

\* cited by examiner

DISEASE PREDICTION SYSTEM AND APPARATUS BASED ON MULTI-RELATION FUNCTIONAL CONNECTIVITY MATRIX

CROSS-REFERENCE TO RELATED APPLICATIONS

The present disclosure claims priority to Chinese Patent Application No. 202210218603.3 filed to China Intellectual Property Administration on Mar. 8, 2022 and entitled "DISEASE PREDICTION SYSTEM AND APPARATUS BASED ON MULTI-RELATION FUNCTIONAL CONNECTIVITY MATRIX", which is incorporated herein by reference in its entirety.

TECHNICAL FIELD

The present disclosure relates to the field of neuroimaging data analysis, in particular to a disease prediction method, system and apparatus based on a multi-relation functional connectivity matrix.

BACKGROUND

Functional Magnetic Resonance Imaging (fMRI) uses magnetic resonance imaging to measure hemodynamic changes caused by neuronal activities, and is a commonly used neuroimaging technology. Because of the characteristics such as non-invasion, non-invasiveness, good spatiotemporal resolution and low cost, the fMRI has been widely used in the fields of clinical medicine, cognitive neuroscience, psychiatry, etc.

Resting State Functional Magnetic Resonance Imaging (rs-fMRI) reflects the neural baseline activity of the brain in the absence of tasks, and is an important method in recent years to study brain functions, especially brain network connectivity. The rs-fMRI has been widely used in the research of nerve diseases, such as autism, epilepsy, and Alzheimer's disease.

Functional connectivity (FC) can be used to assess the degree of functional association between brain regions, is a common indicator in the field of brain imaging, and is often used as a feature of mental disease classification. The general process is as follows: first, selecting a brain region template, such as AAL (Automated Anatomical Labeling) (see the paper: Tzourio-Mazoyer et al. "Automated Anatomical Labeling of activations in SPM using a Macroscopic Anatomical Parcellation of the MNI MRI single-subject brain". NeuroImage. 15 (1): 273-289.), Yeo 2011 (see the paper: Yeo et al. The organization of the human cerebral cortex estimated by intrinsic functional connectivity, J Neurophysiol. 2011 September; 106(3): 1125-1165.); second, extracting average time signals of brain regions based on the brain region template, and calculating a functional connectivity between every two average time signals of the brain regions to obtain a functional connectivity matrix; and finally, vectorizing the functional connectivity matrix, and inputting the functional connectivity matrix as a feature into a machine learning model or a deep learning model for disease prediction.

The most commonly used method for calculating a functional connectivity is to calculate a Pearson correlation coefficient of rs-fMRI time signals of every two brain regions, and then calculate a correlation (COR) coefficient matrix of all brain regions. The value range of the Pearson correlation coefficient is −1 to 1. When the correlation coefficient is 1, it indicates that the time signals of two brain regions are completely positively correlated. When the correlation coefficient is −1, it indicates that the time signals of two brain regions are completely negatively correlated. When the correlation coefficient is 0, it indicates that the time signals of two brain regions are not correlated. For two synchronous signals, the Pearson correlation coefficient can well reflect the degree of correlation between the two signals. When the assumption of stable brain functions and synchronization of functional signals of different brain regions within a specific time period is satisfied, the Pearson correlation coefficient can well reflect a similarity of functional signals of different brain regions. However, studies have shown that the functional connectivity is dynamically altered and functional signals of different brain regions are asynchronous.

Dynamic Time Warping (DTW) (see the paper: Sakoe, H et al. Dynamic programming algorithm optimization for spoken word recognition. IEEE Trans. Acoust. Speech Signal Process. 26, 43-49.) can calculate a similarity of two time series with different lengths and different rhythms. The time series are locally scaled on a time axis to make the modalities of the two series as consistent as possible, so as to calculate a maximum possible similarity of the two series. The DTW distance is a positive number. The longer the DTW distance, the lower the similarity of two series, and the shorter the DTW distance, the greater the similarity of two series. The DTW distance of two series with strong correlation is close to 0. For asynchronous fMRI time series of two brain regions, the DTW distance of the two can be calculated as a similarity measure. However, the DTW distance can only be a positive number and cannot reflect the correlation directions of the time series of different brain regions. In addition, the maximum value of the DTW distance is related to the number of time points in time series and the amplitude of functional signals. The more sampling points and the greater the amplitude of functional signals, the longer the DTW distance. For resting state functional magnetic resonance images acquired from different centers, or even from the same center at different times, the ranges of calculated DTW distances may be different, thus limiting large-scale and multi-center resting state functional magnetic resonance data processing and analysis characterized by DTW distances.

SUMMARY

The objective of the present disclosure is to propose a disease prediction method, system and apparatus based on a multi-relation functional connectivity matrix in response to the deficiencies of the prior art.

The objective of the present disclosure is achieved through the following technical solutions: in a first aspect, the present disclosure provides a disease prediction system based on a multi-relation functional connectivity matrix, including a disease prediction device and a storage device, wherein the storage device is configured to store user's resting state brain functional magnetic resonance image data;

The disease prediction device includes a subject acquisition and pre-processing module, a brain region time series extraction module, a Pearson correlation coefficient calculation module, a dynamic time warping module, a matrix conversion module and a matrix combination module:

The subject acquisition and pre-processing module is configured to acquire a plurality of pre-processed resting state brain functional magnetic resonance images of subjects from the storage device;

The brain region time series extraction module is configured to use a brain image atlas to extract a time series of each brain region from pre-processed data of each subject;

The Pearson correlation coefficient calculation module is configured to calculate a Pearson correlation coefficient of the time series of every two brain regions for each subject, to obtain a Pearson correlation coefficient matrix COR between the time series of the brain regions;

The dynamic time warping module is configured to calculate a dynamic time warping (DTW) distance of the time series of every two brain regions for each subject, to obtain an original DTW distance matrix;

The matrix conversion module is configured to perform corresponding conversion on the DTW distance matrix obtained by the dynamic time warping module in combination with the Pearson correlation coefficient matrix calculated by the Pearson correlation coefficient calculation module for each subject, to obtain a converted DTW' matrix which includes correlation degree and correlation direction information and whose numerical range is equivalent to the value range of the Pearson coefficient;

The matrix combination module is configured to perform weighted combination on the Pearson correlation coefficient matrix COR and the DTW' matrix for each subject to obtain a functional connectivity matrix FC; and a disease prediction result is obtained through the functional connectivity matrix FC.

Further, the pre-processing process of the resting state functional magnetic resonance images in the subject acquisition and pre-processing module includes: skull removal from structural images, head motion correction, time alignment, spatial smoothing, image registration and spatial normalization.

Further, the brain image atlas in the brain region time series extraction module includes a brain anatomy atlas, a brain functional atlas and a multi-modal brain atlas.

Further, the matrix conversion module includes a first conversion submodule, a normalization submodule, a second conversion submodule and a third conversion submodule;

In the matrix conversion module, the DTW distance matrix is converted into the DTW' matrix, including:

The first conversion submodule is configured to invert the DTW distance matrix to obtain a DTW inverse matrix, that is, a DTW_OP matrix;

The normalization submodule is configured to perform normal distribution fitting on the DTW_OP matrix to obtain means and standard deviations of normal distribution, and perform a normalization operation on each value in the DTW_OP matrix to obtain a DTW normalization matrix, that is, a DTW_NORM matrix;

The second conversion submodule is configured to convert all negative numbers in the DTW_NORM matrix to 0 to obtain a DTW matrix without negative numbers, that is, a DTW_POS matrix;

The third conversion submodule is configured to multiply the values of corresponding positions in the DTW_POS matrix by 1 or −1 according to the positive or negative values in the Pearson correlation coefficient matrix to obtain the DTW' matrix.

Further, in the DTW' matrix, the positive and negative values indicate correlation directions of two corresponding brain regions.

Further, the combination mode of the functional connectivity matrix FC in the matrix combination module is: $FC=COR+\delta DTW'$, where $\delta$ is a weight coefficient.

Further, in the matrix combination module, after the functional connectivity matrix FC is obtained, the functional connectivity matrix FC is input as a feature into a machine learning model or a deep learning model for disease prediction.

In a second aspect, the present disclosure provides a disease prediction apparatus based on a multi-relation functional connectivity matrix, the apparatus including a subject acquisition and pre-processing module, a brain region time series extraction module, a Pearson correlation coefficient calculation module, a dynamic time warping module, a matrix conversion module and a matrix combination module;

The subject acquisition and pre-processing module is configured to acquire a plurality of pre-processed resting state brain functional magnetic resonance images of subjects;

The brain region time series extraction module is configured to use a brain image atlas to extract a time series of each brain region from pre-processed data of each subject obtained by the subject acquisition and pre-processing module;

The Pearson correlation coefficient calculation module is configured to calculate a Pearson correlation coefficient of the time series of every two brain regions of the subject, to obtain a Pearson correlation coefficient matrix COR between the time series of the brain regions;

The dynamic time warping module is configured to calculate a dynamic time warping (DTW) distance of the time series of every two brain regions of the subject to obtain an original DTW distance matrix;

The matrix conversion module is configured to perform corresponding conversion on the DTW distance matrix obtained by the dynamic time warping module in combination with the Pearson correlation coefficient matrix obtained by the Pearson correlation coefficient calculation module, to obtain a converted dynamic time warping matrix which includes correlation degree and correlation direction information and whose numerical range is equivalent to the value range of the Pearson coefficient, that is, a DTW' matrix;

The matrix combination module is configured to perform weighted combination on the Pearson correlation coefficient matrix COR obtained by the Pearson correlation coefficient calculation module and the DTW' matrix obtained by the matrix conversion module to obtain a functional connectivity matrix FC; and a disease prediction result is obtained through the functional connectivity matrix FC.

In a third aspect, the present disclosure provides a disease prediction method based on a multi-relation functional connectivity matrix, comprising disease prediction process and a storing process, wherein the storing process comprises storing user's resting state brain functional magnetic resonance image data; the disease prediction process comprises the following steps:

a subject acquisition and pre-processing step: acquiring a plurality of pre-processed resting state brain functional magnetic resonance images of subjects from the storage device;

a brain region time series extraction step: using a brain image atlas to extract a time series of each brain region from pre-processed data of each subject;

a Pearson correlation coefficient calculation step: calculating a Pearson correlation coefficient of the time series of every two brain regions for each subject, to obtain a Pearson correlation coefficient matrix COR between the time series of the brain regions;

a dynamic time warping step: calculating a dynamic time warping (DTW) distance of the time series of every two brain regions for each subject, to obtain an original DTW distance matrix;

a matrix conversion step: performing corresponding conversion on the DTW distance matrix obtained by the dynamic time warping step in combination with the Pearson correlation coefficient matrix calculated by the Pearson correlation coefficient calculation step for each subject, to obtain a converted DTW' matrix which includes correlation degree and correlation direction information and whose numerical range is equivalent to the value range of the Pearson coefficient;

wherein the matrix conversion step specifically comprises the following substeps:

a first conversion substep: inverting the DTW distance matrix to obtain a DTW inverse matrix, that is, a DTW_OP matrix;

a normalization substep: performing normal distribution fitting on the DTW_OP matrix to obtain means and standard deviations of normal distribution, and performing a normalization operation on each value in the DTW_OP matrix to obtain a DTW normalization matrix, that is, a DTW_NORM matrix;

a second conversion substep: converting all negative numbers in the DTW_NORM matrix to 0 to obtain a DTW matrix without negative numbers, that is, a DTW_POS matrix;

a third conversion substep: multiplying the values of corresponding positions in the DTW_POS matrix by 1 or −1 according to the positive or negative values in the Pearson correlation coefficient matrix to obtain the DTW' matrix; and a matrix combination step: performing weighted combination on the Pearson correlation coefficient matrix COR and the DTW' matrix for each subject to obtain a functional connectivity matrix FC, wherein the combination mode is FC=COR+$\delta$DTW', where $\delta$ is a weight coefficient; and a disease prediction result is obtained through the functional connectivity matrix FC.

According to an embodiment of the disease prediction method based on a multi-relation functional connectivity matrix, wherein the pre-processing process of the resting state functional magnetic resonance images in the subject acquisition and pre-processing step comprises: skull removal from structural images, head motion correction, time alignment, spatial smoothing, image registration and spatial normalization.

According to an embodiment of the disease prediction method based on a multi-relation functional connectivity matrix, wherein the brain image atlas in the brain region time series extraction step comprises a brain anatomy atlas, a brain functional atlas and a multi-modal brain atlas.

According to an embodiment of the disease prediction method based on a multi-relation functional connectivity matrix, wherein in the DTW' matrix, the positive and negative values indicate correlation directions of two corresponding brain regions.

According to an embodiment of the disease prediction method based on a multi-relation functional connectivity matrix, wherein in the matrix combination step, after the functional connectivity matrix FC is obtained, the functional connectivity matrix FC is input as a feature into a machine learning model or a deep learning model for disease prediction.

The present disclosure has the beneficial effects that a functional connectivity matrix that can better reflect the correlation between functional signals of different brain regions is calculated by combining the Pearson correlation coefficient with DTW distance information. Using the functional connectivity matrix calculated by this method as a feature to predict mental diseases can improve the accuracy of disease prediction and the generalization ability of the prediction model in multi-center data.

DETAILED DESCRIPTION

In order to make those skilled in the art better understand the technical solutions in the present disclosure, the present invention will be further described below with reference to the accompanying drawings. However, this is only a part of the embodiments of the present disclosure, not all of the embodiments. Based on the specific embodiments described in the present disclosure, other embodiments obtained by other persons in the art without creative effort shall fall within the conceptual scope of the present invention.

Preferred embodiments of the present disclosure are described below with reference to the accompanying drawings.

Figure 1:
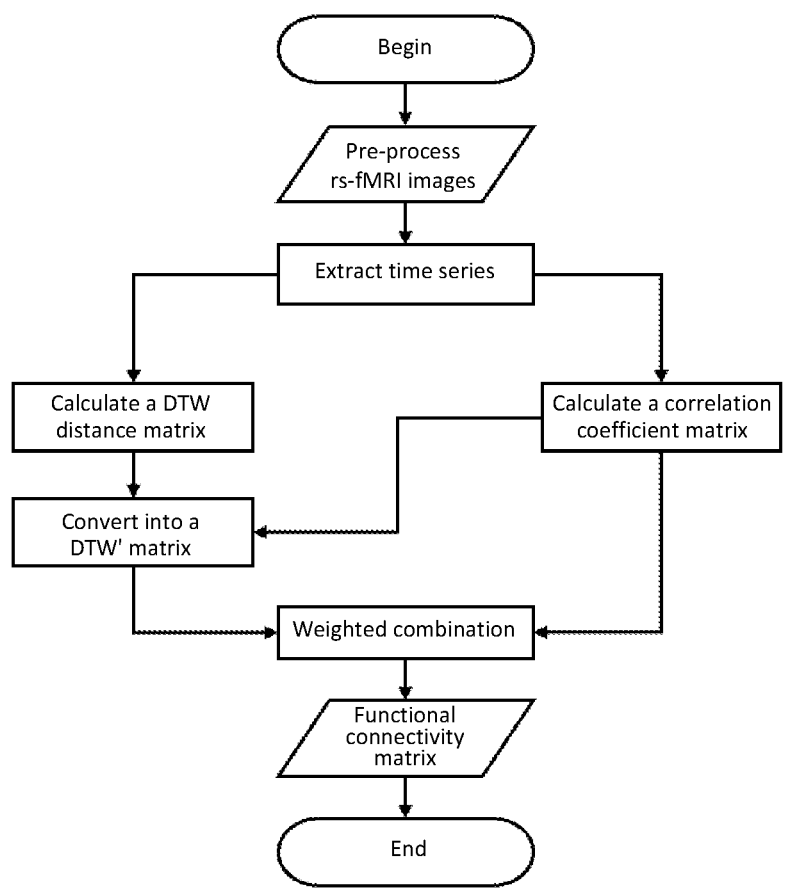
FIG. 1 is a flowchart of realizing functions by various modules of a disease prediction device in a disease prediction system of the present disclosure.

The present disclosure proposes a disease prediction system based on a multi-relation functional connectivity matrix. A Pearson correlation coefficient matrix and a DTW distance matrix are respectively calculated according to resting state functional magnetic resonance time series extracted from a brain atlas, the DTW distance matrix is converted in combination with the Pearson correlation coefficient matrix into a DTW' matrix which includes correlation degree and correlation direction information and whose numerical range is equivalent to the value range of a Pearson coefficient, and then weighted combination is performed on the Pearson correlation coefficient matrix and the converted DTW' matrix to calculate a functional connectivity matrix. The structural block diagram of the system is shown in FIG. 1. Based on the Pearson correlation coefficient, the functional connectivity matrix calculated by this system is further combined with DTW distance information to weaken the dynamic change of functional connectivity and the influence of asynchrony of functional signals in different brain regions on the functional connectivity matrix, so that the calculated functional connectivity matrix can better reflect the correlation between the functional signals in different brain regions. Using the functional connectivity matrix calculated by this system as a feature to predict mental diseases can improve the accuracy of disease prediction and the generalization ability of a prediction model in multi-center data. The disease prediction system includes a disease prediction device and a storage device, wherein the storage device is configured to store user's resting state brain functional magnetic resonance image data;

The disease prediction device includes a subject acquisition and pre-processing module, a brain region time series extraction module, a Pearson correlation coefficient calculation module, a dynamic time warping module, a matrix conversion module and a matrix combination module;

The subject acquisition and pre-processing module is configured to collect pre-processed resting state functional magnetic resonance data of 866 subjects from ABIDE (Autism Brain Imaging Data Exchange), and perform pre-processing such as skull removal from structural images, head motion correction, time alignment, spatial smoothing, image registration and spatial normalization. Among the 866 subjects in the ABIDE data set, 402 are autistics and 464 are normal subjects. The resting state functional magnetic resonance data are collected from 20 different scan centers. The types and numbers of subjects collected at each center are shown in Table 1 below:

TABLE 1

| Scan center | Autistic | Normal person | Total |
| --- | --- | --- | --- |
| NYU | 74 | 98 | 172 |
| SDSU | 8 | 18 | 26 |
| LEUVEN_2 | 12 | 16 | 28 |
| MAX_MUN | 19 | 27 | 46 |
| UM_2 | 13 | 21 | 34 |
| UCLA_1 | 37 | 27 | 64 |
| UM_1 | 33 | 52 | 85 |
| PITT | 24 | 26 | 50 |
| YALE | 22 | 18 | 40 |
| KKI | 12 | 20 | 32 |
| STANFORD | 12 | 13 | 25 |
| OHSU | 12 | 13 | 25 |
| UCLA_2 | 11 | 10 | 21 |
| CMU | 6 | 4 | 10 |
| TRINITY | 19 | 25 | 44 |
| LEUVEN_1 | 14 | 14 | 28 |
| SBL | 12 | 14 | 26 |
| CALTECH | 5 | 10 | 15 |
| USM | 43 | 24 | 67 |
| OLIN | 14 | 14 | 28 |

The brain region time series extraction module uses the existing brain image atlas, including a brain anatomy atlas, a brain functional atlas and a multi-modal brain atlas, etc., to extract a time series of each brain region from the pre-processed data of all subjects. Preferably, an AAL template is selected to extract the time series of each brain region. The AAL template includes a total of 116 brain regions. After the time series are extracted, an N*116 time series matrix is obtained, where N represents a time series length of resting state functional magnetic resonance images.

The Pearson correlation coefficient calculation module is configured to calculate, using the time series matrix, a Pearson correlation coefficient between the time series of every two brain regions for each subject, to obtain a 116*116 symmetric Pearson correlation coefficient matrix COR. The formula (1) for calculating the Pearson correlation coefficient is as follows:

$$r = \frac{\sum_{i=1}^{n}(X_i - \bar{X})(Y_i - \bar{Y})}{\sqrt{\sum_{i=1}^{n}(X_i - \bar{X})^2}\sqrt{\sum_{i=1}^{n}(Y_i - \bar{Y})^2}} \quad \text{Formula (1)}$$

Herein, r represents the Pearson correlation coefficient, $X_i$ represents the i-th time point signal of the time series X of one brain region, $Y_i$ represents the i-th time point signal of the time series Y of the other brain region, $\bar{X}$ represents a mean value of the time series X, $\bar{Y}$ represents a mean value of the time series Y, i=1, 2, . . . , n, and n represents the number of time series signals.

The dynamic time warping module is configured to calculate, using the time series matrix, a DTW distance between the time series of every two brain regions for each subject, to obtain a 116*116 symmetric DTW matrix. To calculate the DTW distance of two time series, a distance matrix between points of the two series needs to be calculated. The calculation formula (2) of each position value in the matrix is as follows:

$$DTW(i, j) = \quad \text{Formula (2)}$$
$$\begin{cases} \|X_i, Y_j\| + \min\{DTW(i, j-1), DTW(i-1, j), \\ \quad DTW(i-1, j-1)\} \text{ if } i, j > 1 \\ \|X_i, Y_j\| + DTW(i, j-1) \text{ if } i = 1, j > 1 \\ \|X_i, Y_j\| + DTW(i-1, j) \text{ if } j = 1, i > 1 \\ \|X_i, Y_j\| \text{ if } i = 1, j = 1 \end{cases}$$

DTW(i, j) represents an element of the i-th row and j-th column in the DTW matrix, $X_i$ represents the i-th time point signal of the time series X, and $Y_j$ represents the j-th time point signal of the time series Y. $\|X_i, Y_j\|$ represents a Euclidean distance between $X_i$ and $Y_j$. After the distance matrix of X and Y is calculated, a path from the upper left corner of the matrix to the lower right corner is sought, so that the sum of the elements on the path is minimum. Then the sum of all values on the path is the DTW distance between X and Y.

The matrix conversion module is configured to perform corresponding conversion on the DTW distance matrix obtained by the dynamic time warping module in combination with the Pearson correlation coefficient matrix calculated by the Pearson correlation coefficient calculation module for each subject, to obtain a converted DTW' matrix which includes correlation degree and correlation direction information and whose numerical range is equivalent to the value range of the Pearson coefficient; the matrix conversion module includes a first conversion submodule, a normalization submodule, a second conversion submodule, and a third conversion submodule;

The first conversion submodule is configured to invert the DTW distance matrix to obtain a DTW inverse matrix, that is, a DTW_OP matrix, in which the larger the value, the higher the correlation between two brain regions;

The normalization submodule is configured to perform normal distribution fitting on the DTW_OP matrix to obtain means and standard deviations of the distribution, subtract the calculated mean from each value in the DTW_OP matrix, and divide by the standard deviation to perform a normalization operation to obtain a DTW normalization matrix, that is, a DTW_NORM matrix, in which the overall value obeys the standard normal distribution;

The second conversion submodule is configured to, for the positions where the value is less than 0 in the DTW_NORM matrix (which can be considered that there is no correlation between two brain regions), convert all the negative numbers in the DTW_NORM matrix into 0 to obtain a DTW matrix without negative numbers, that is, a DTW_POS matrix;

The third conversion submodule is configured to multiply the values of the corresponding positions in the DTW_POS matrix by 1 or −1 according to the positive or negative values in the Pearson correlation coefficient matrix to obtain a DTW' matrix, that is, the conversion of the DTW distance matrix is completed. In the DTW' matrix, the positive or negative values can indicate correlation directions of two corresponding brain regions.

The matrix combination module is configured to perform weighted combination on the Pearson correlation coefficient matrix COR and the DTW' matrix for each subject to obtain a functional connectivity matrix FC. The specific combination mode is: FC=COR+δDTW', where δ is a weight coefficient, and its value is 0.1. The calculated FC is input as a feature into a machine learning model or a deep learning model for disease prediction to obtain a disease prediction result.

Figure 2:
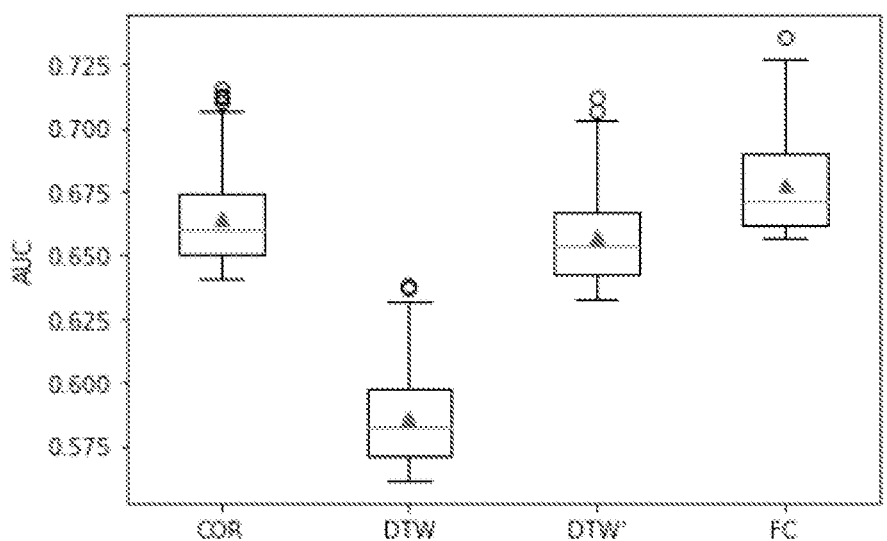
FIG. 2 is an AUC box plot of predicted results on a test set when a whole ABIDE data set is randomly scrambled and split into the test set and a training set.

In order to verify the validity of the functional connectivity matrix FC obtained by the system, the following two verifications are made:

Verification 1: Verify whether the functional connectivity matrix FC calculated by this system can improve the effect of autism prediction compared with the Pearson correlation coefficient matrix COR, the original DTW distance matrix and the converted DTW' matrix. For all subjects, the Pearson correlation coefficient matrix COR, the DTW distance matrix, the converted DTW' matrix and the functional connectivity matrix FC are processed in the same way as follows: 1) take lower triangular values excluding diagonals, and serially flatten the same into one-dimensional vectors to obtain a 866*6670-dimensional feature matrix; 2) calculate F values by means of variance analysis for feature selection, and select 5% of the features to obtain a 866*334-dimensional feature matrix; 3) randomly scramble the feature matrix after the feature selection according to the subjects, split the feature matrix into a test set (75%) and a training set (25%), train a classifier with the training set, perform prediction on the test set after the training is completed, and calculate AUC (Area under the ROC Curve) values. Preferably, the classifier used is a linear SVC classifier, and its main parameters are set as: the regularization parameter is L2, the loss function is squared_hinge, the penalty coefficient of the loss function is 1, the allowable deviation for stopping iteration is 0.0001, and the maximum number of iterations is 1000; 4) repeat step 3) 500 times, select top ⅓ of the AUC values obtained by predicting the four features COR, DTW, DTW', and FC on the test set, draw a box plot, calculate means and use T test to verify mean difference. Verifying the FC obtained by this system improves the disease prediction effect. The box plot of AUC value distribution of the four features on the prediction set is shown in FIG. 2, and the means are shown in Table 2 below:

TABLE 2

|  | COR | DTW | DTW' | FC |
|---|---|---|---|---|
| AUC mean | 0.664 | 0.5861 | 0.657 | 0.678 |

The AUC values of COR, DTW, DTW' and FC are calculated by T test, and the statistical results are shown in Table 3 below:

TABLE 3

|  | COR | DTW | DTW' |
|---|---|---|---|
| T(P value) | 7.06(9.50e−12) | 46.4385(9.2050e−149) | 10.79(1.67e−23) |

It can be seen from the box plot, means and T test results that, compared with COR, DTW and DTW', the AUC value of autism prediction based on the FC obtained by the system of the present disclosure is significantly improved.

Figure 3:
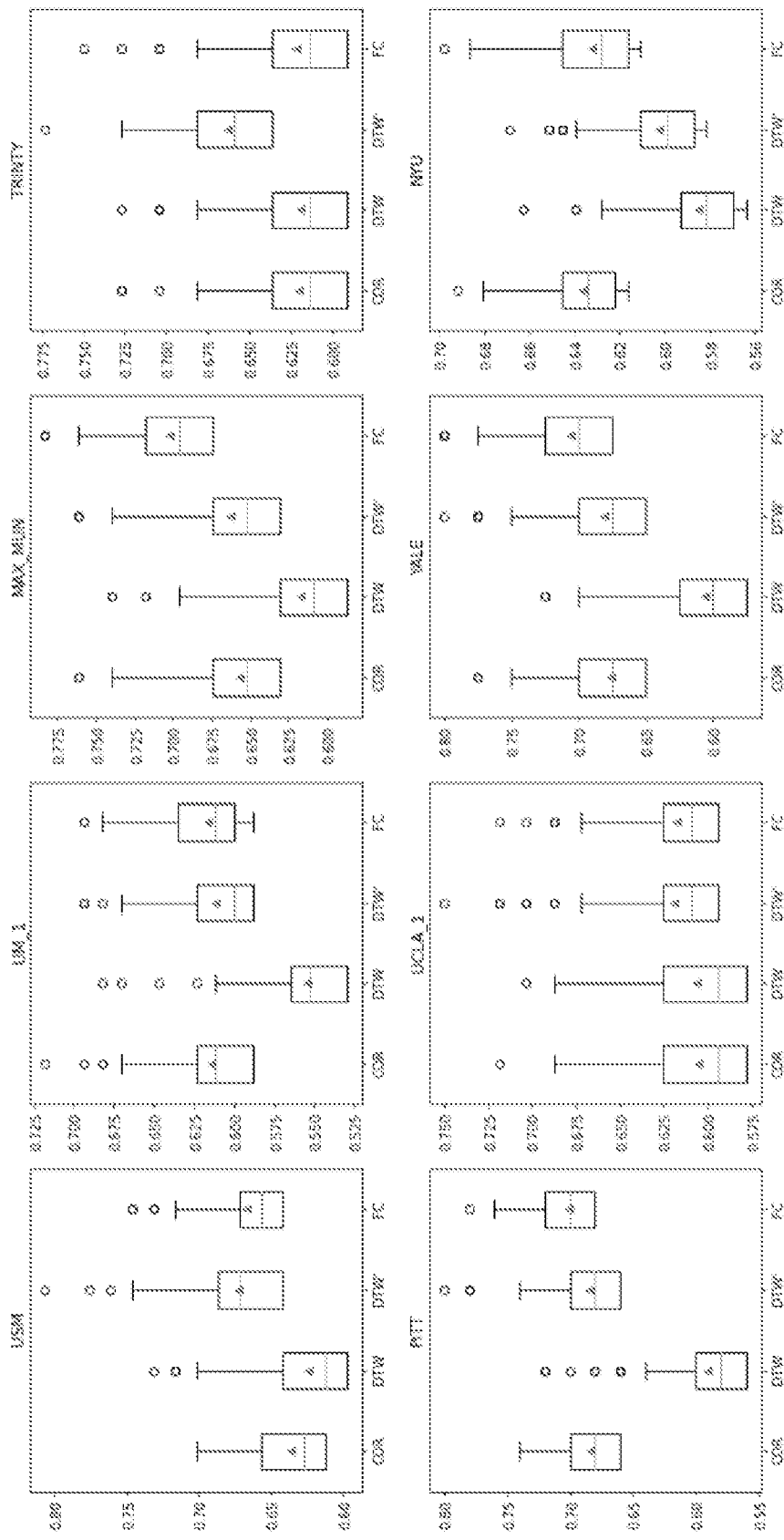
FIG. 3 is an AUC box plot of predicted results on 8 centers when 8 scanned data in ABIDE are used as test data separately.

Verification 2: Verify whether the functional connectivity matrix FC calculated by this system can better weaken the influence of multi-center data difference compared with the Pearson correlation coefficient matrix COR, the original DTW distance matrix and the converted DTW' matrix. The data of 866 subjects in the ABIDE data set are collected from 20 scan centers, of which 8 have more than 40 subjects collected in a single scan center, respectively USM, UM_1, MAX_MUN, TRINTY, PITT, UCLA_1, YALE, NYU. For all subjects, the Pearson correlation coefficient matrix COR, the DTW distance matrix, the converted DTW' matrix and the functional connectivity matrix FC are processed in the same way as follows: 1) take lower triangular values excluding diagonals, and serially flatten the same into one-dimensional vectors to obtain a 866*6670-dimensional feature matrix; 2) calculate F values by means of variance analysis for feature selection, and select 5% of the features to obtain a 866*334-dimensional feature matrix; 3) select the data of 1 center as a test set from the 8 centers from which the data of more than 40 subjects are collected, take the data of the remaining centers as a training set, train a classifier with the data of the training set, perform prediction on the test set after the training is completed, and calculate AUC values. Preferably, the classifier used is a linear SVC classifier, and its main parameters are set as: the regularization parameter is L2, the loss function is squared_hinge, the penalty coefficient of the loss function is 1, the allowable deviation for stopping iteration is 0.0001, and the maximum number of iterations is 1000; 4) repeat step 3) 500 times, select top ⅓ of the AUC values obtained by predicting the four features COR, DTW, DTW', and FC on the test set, draw a box plot, calculate means and use T test to verify mean difference. Verifying the FC obtained by this system improves the disease prediction effect. 5) Select the data of another center as a test set from the 8 centers from which the data of more than 40 subjects are collected, and repeat steps 3) and 4) until the data of the 8 centers are separately used as the test set for test. The box plot of AUC value distribution of the four features calculated on the test sets of the 8 centers is shown in FIG. 3, and the means are shown in Table 4 below:

TABLE 4

|  | COR | DTW | DTW' | FC |
|---|---|---|---|---|
| USM | 0.6359↑ | 0.6236↑ | 0.6726↓ | 0.6668 |
| UM_1 | 0.6142↑ | 0.5549↑ | 0.6114↑ | 0.6165 |
| MAX_MUM | 0.6566↑ | 0.6178↑ | 0.6627↑ | 0.7020 |
| TRINITY | 0.6201↑ | 0.6190↑ | 0.6633↓ | 0.6220 |
| PITT | 0.6836↑ | 0.5910↑ | 0.6848↑ | 0.7003 |
| UCLA_1 | 0.6055↑ | 0.6061↑ | 0.6193↓ | 0.6175 |
| YALE | 0.6756↑ | 0.6054↑ | 0.6806↑ | 0.7055 |
| NYU | 0.6361↓ | 0.5849↑ | 0.6021↑ | 0.6321 |

The up and down arrows in the three columns of COR, DTW, and DTW' indicate the difference of the predicted AUC values compared with the FC. The up arrow indicates that the prediction is based on the FC feature, and the obtained AUC mean is high. The down arrow indicates that the prediction is based on the FC feature, and the obtained AUC mean is high.

The AUC values of COR, DTW, DTW' and FC are calculated by T test, and the statistical results of each center are shown in Table 5 below:

TABLE 5

| T(P value) | COR | DTW | DTW' |
|---|---|---|---|
| USM | 10.1975 (8.1588e−21)** | 13.6792 (1.2179e−32)** | 1.7515 (0.0809) |
| UM_1 | 0.7855 (0.4327) | 20.7825 (2.2330e−60)** | 1.7779 (0.0764) |
| MAX_MUM | 12.8004 (1.5701e−29)** | 22.4217 (1.3442e−63)** | 10.6428 (2.5572e−22)** |
| TRINITY | 0.5060 (0.6131) | 0.8082 (0.4195) | 11.8446 (4.6580e−27)** |
| PITT | 6.1714 (2.4053e−09)** | 31.2211 (7.1179e−93)** | 4.5940 (6.9611e−06)** |
| UCLA_1 | 3.6452 (0.00031)** | 3.6613 (0.0003)** | 0.5250 (0.6000) |
| YALE | 7.7377 (2.1524e−13)** | 28.1394 (1.5151e−88)** | 6.5509 (2.5404e−10)** |
| NYU | 2.0150 (0.0447)* | 21.9009 (1.2891e−64)** | 14.2677 (4.6052e−36)** |

It can be seen from the box plot, mean table and T test statistical table that, compared with COR, the predicted AUC value of FC in 6 centers of autism is significantly improved; compared with the original DTW matrix, the predicted AUC value of FC in 7 centers of autism is significantly improved; and compared with the converted DTW' matrix, the predicted AUC value of FC in 4 centers of autism is significantly improved.

Figure 4:
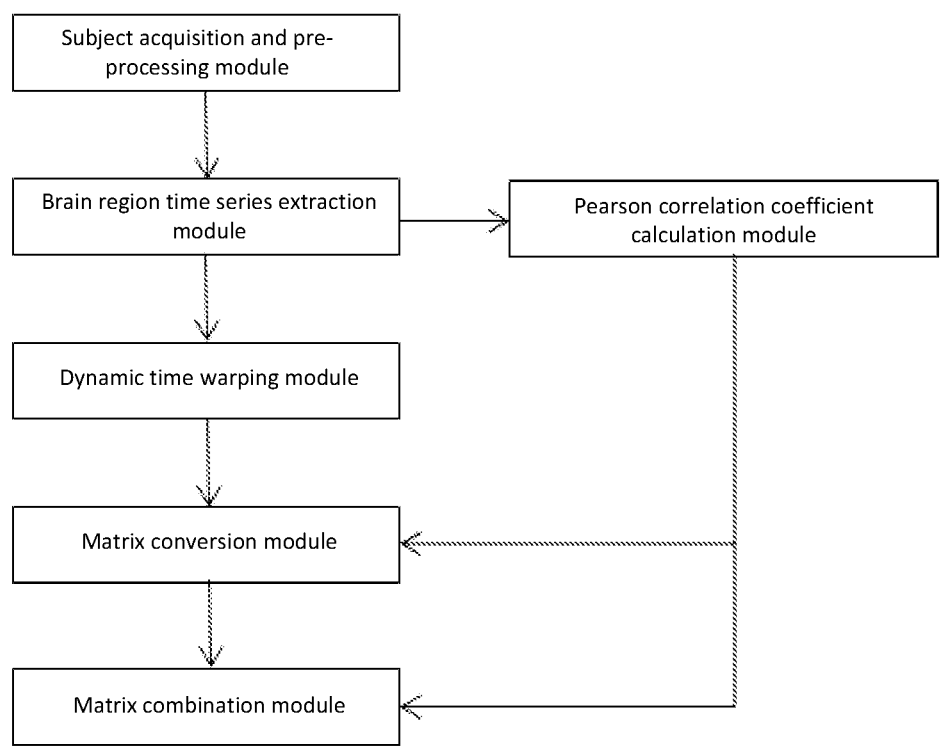
FIG. 4 is a structural block diagram of a disease prediction apparatus in the present disclosure.

An embodiment of the present disclosure further provides a disease prediction apparatus. The apparatus may include modules for performing the corresponding functions of the devices in the system of FIG. 1 described above. Refer to FIG. 4, which is a schematic structural diagram of a disease prediction apparatus provided by an embodiment of the present disclosure. The disease prediction apparatus described in this embodiment may be configured in a disease prediction device. As shown in FIG. 4, the disease prediction apparatus in this embodiment may include: a subject acquisition and pre-processing module, a brain region time series extraction module, a Pearson correlation coefficient calculation module, a dynamic time warping module, a matrix conversion module and a matrix combination module;

The subject acquisition and pre-processing module is configured to acquire a plurality of pre-processed resting state brain functional magnetic resonance images of subjects;

The brain region time series extraction module is configured to use a brain image atlas to extract a time series of each brain region from pre-processed data of each subject obtained by the subject acquisition and pre-processing module;

The Pearson correlation coefficient calculation module is configured to calculate a Pearson correlation coefficient of the time series of every two brain regions of the subject, to obtain a Pearson correlation coefficient matrix COR between the time series of the brain regions;

The dynamic time warping module is configured to calculate a dynamic time warping (DTW) distance of the time series of every two brain regions of the subject to obtain an original DTW distance matrix;

The matrix conversion module is configured to perform corresponding conversion on the DTW distance matrix obtained by the dynamic time warping module in combination with the Pearson correlation coefficient matrix obtained by the Pearson correlation coefficient calculation module, to obtain a converted dynamic time warping matrix which includes correlation degree and correlation direction information and whose numerical range is equivalent to the value range of the Pearson coefficient, that is, a DTW' matrix;

The matrix combination module is configured to perform weighted combination on the Pearson correlation coefficient matrix COR obtained by the Pearson correlation coefficient calculation module and the DTW' matrix obtained by the matrix conversion module to obtain a functional connectivity matrix FC; and a disease prediction result is obtained through the functional connectivity matrix FC.

It can be understood that each functional module of the disease prediction apparatus in this embodiment can be specifically implemented according to the flow in FIG. 1 of the above-mentioned system embodiment, and the specific implementation process can refer to the relevant description in FIG. 1 of the system embodiment. Details are not repeated here.

Figure 5:
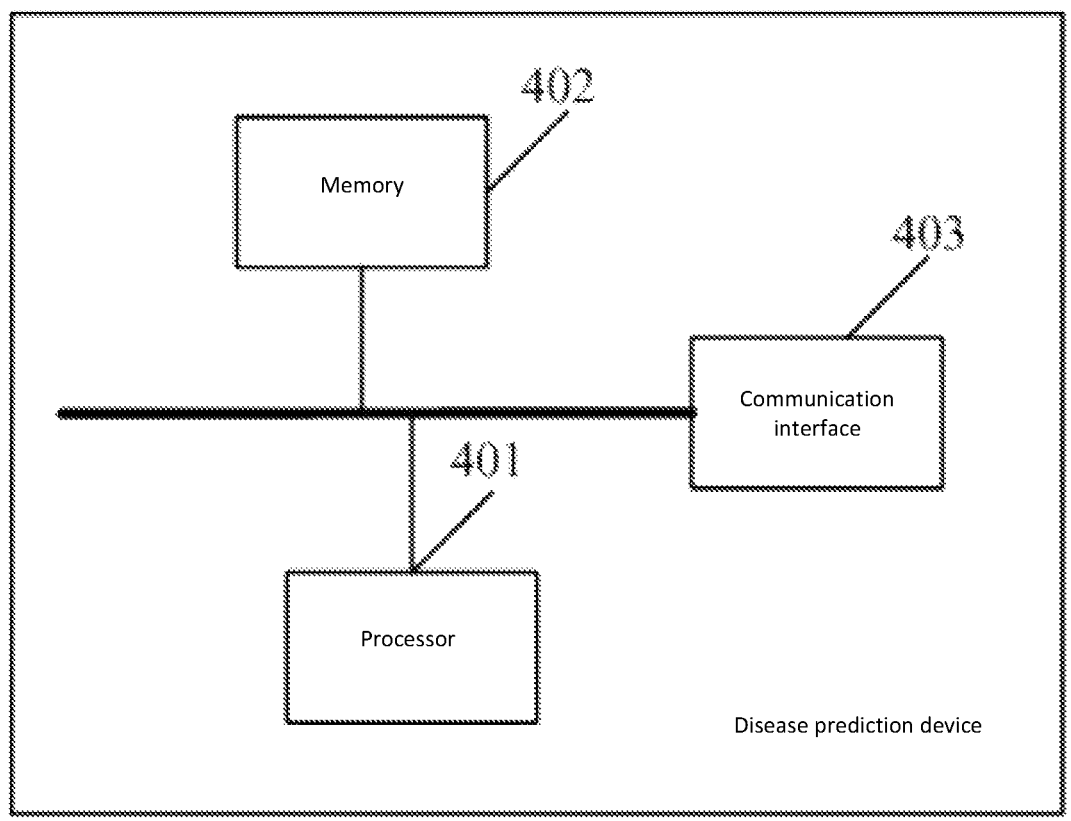
FIG. 5 is a schematic structural diagram of a disease prediction device in the present disclosure.

Refer to FIG. 5, which is a schematic structural diagram of a disease prediction device provided by an embodiment of the present disclosure. As shown in FIG. 5, the disease prediction device may include: a processor and a memory. Optionally, the disease prediction device may further include a communication interface. The above-mentioned processor, memory, and communication interface may be connected by a bus or in other manners, and they are connected by a bus in FIG. 5 as an example. The communication interface may be controlled by the processor to receive and send messages.

In some embodiments, the storage device is a blockchain node; the processor may further perform the following steps:
  sending a resting state brain functional magnetic resonance image data acquisition request to the storage device through the communication interface, the resting state brain functional brain magnetic resonance image data acquisition request carrying an identifier of a target subject, so that the storage device verifies the identity of the disease prediction device, and if the verification is passed, the storage device inquires and acquires the resting state brain functional magnetic resonance image data of the target subject according to the identifier of the target subject, and sends the resting state brain functional magnetic resonance image data to the disease prediction device; and
  receiving, through the communication interface, the resting state brain functional magnetic resonance image data of the target subject sent by the storage device.

In another embodiment, the present disclosure provides a disease prediction method based on a multi-relation functional connectivity matrix, comprising disease prediction process and a storing process, wherein the storing process comprises storing user's resting state brain functional magnetic resonance image data; the disease prediction process comprises the following steps:
  a subject acquisition and pre-processing step: acquiring a plurality of pre-processed resting state brain functional magnetic resonance images of subjects from the storage device;
  a brain region time series extraction step: using a brain image atlas to extract a time series of each brain region from pre-processed data of each subject;
  a Pearson correlation coefficient calculation step: calculating a Pearson correlation coefficient of the time series of every two brain regions for each subject, to obtain a Pearson correlation coefficient matrix COR between the time series of the brain regions;

a dynamic time warping step: calculating a dynamic time warping (DTW) distance of the time series of every two brain regions for each subject, to obtain an original DTW distance matrix;

a matrix conversion step: performing corresponding conversion on the DTW distance matrix obtained by the dynamic time warping step in combination with the Pearson correlation coefficient matrix calculated by the Pearson correlation coefficient calculation step for each subject, to obtain a converted DTW' matrix which includes correlation degree and correlation direction information and whose numerical range is equivalent to the value range of the Pearson coefficient;

wherein the matrix conversion step specifically comprises the following substeps:

a first conversion substep: inverting the DTW distance matrix to obtain a DTW inverse matrix, that is, a DTW_OP matrix;

a normalization substep: performing normal distribution fitting on the DTW_OP matrix to obtain means and standard deviations of normal distribution, and performing a normalization operation on each value in the DTW_OP matrix to obtain a DTW normalization matrix, that is, a DTW_NORM matrix;

a second conversion substep: converting all negative numbers in the DTW_NORM matrix to 0 to obtain a DTW matrix without negative numbers, that is, a DTW_POS matrix;

a third conversion substep: multiplying the values of corresponding positions in the DTW_POS matrix by 1 or −1 according to the positive or negative values in the Pearson correlation coefficient matrix to obtain the DTW' matrix; and a matrix combination step: performing weighted combination on the Pearson correlation coefficient matrix COR and the DTW' matrix for each subject to obtain a functional connectivity matrix FC, wherein the combination mode is FC=COR+δDTW, where δ is a weight coefficient; and a disease prediction result is obtained through the functional connectivity matrix FC.

According to an embodiment of the disease prediction method based on a multi-relation functional connectivity matrix, wherein the pre-processing process of the resting state functional magnetic resonance images in the subject acquisition and pre-processing step comprises: skull removal from structural images, head motion correction, time alignment, spatial smoothing, image registration and spatial normalization.

According to an embodiment of the disease prediction method based on a multi-relation functional connectivity matrix, wherein the brain image atlas in the brain region time series extraction step comprises a brain anatomy atlas, a brain functional atlas and a multi-modal brain atlas.

According to an embodiment of the disease prediction method based on a multi-relation functional connectivity matrix, wherein in the DTW' matrix, the positive and negative values indicate correlation directions of two corresponding brain regions.

According to an embodiment of the disease prediction method based on a multi-relation functional connectivity matrix, wherein in the matrix combination step, after the functional connectivity matrix FC is obtained, the functional connectivity matrix FC is input as a feature into a machine learning model or a deep learning model for disease prediction.

It should be understood that, in the embodiment of the present disclosure, the processor may be a Central Processing Unit (CPU), and the processor may also be other general-purpose processor, Digital Signal Processor (DSP), Application Specific Integrated Circuit (ASIC), Field-Programmable Gate Array (FPGA) or other programmable logic device, discrete gate or transistor logic device, discrete hardware component, etc. The general-purpose processor may be a microprocessor or any conventional processor, etc.

The memory may include a read-only memory and a random access memory, and provides instructions and data to the processor. A part of the memory may also include a non-volatile random access memory. For example, the memory may also store resting state brain functional magnetic resonance data of a user.

The communication interface may include an input device and/or an output device, for example, the input device may be a control panel, a microphone, a receiver, etc., and the output device may be a display screen, a transmitter, etc., which are not listed here.

In specific implementation, the processor, memory, and communication interface described in the embodiment of the present disclosure may execute the implementation described in the system embodiment in FIG. 1 provided in the embodiment of the present disclosure, and may also execute the implementation of the disease prediction apparatus described in the embodiment of the present disclosure. Details are not repeated here.

What is disclosed above is only a preferred embodiment of the present disclosure, and of course, it cannot limit the scope of the right of the present disclosure. Those of ordinary skill in the art can understand that all or part of the flow of implementing the above-mentioned embodiment and equivalent changes made according to the claims of the present disclosure still fall within the scope of the present disclosure.

What is claimed is:

1. A disease prediction method based on a multi-relation functional connectivity matrix, comprising disease prediction process and a storing process, wherein the storing process comprises storing user's resting state brain functional magnetic resonance image data;

the disease prediction process comprises the following steps:

a subject acquisition and pre-processing step: acquiring a plurality of structural images, generating, with a processor, a plurality of pre-processed resting state brain functional magnetic resonance images of subjects by removing skulls from the plurality of structural images and performing head motion correction, time alignment, spatial smoothing, image registration and spatial normalization on the plurality of structural images;

a brain region time series extraction step: using a brain image atlas to extract a time series of each brain region from pre-processed data of each subject;

a Pearson correlation coefficient calculation step: calculating a Pearson correlation coefficient of the time series of every two brain regions for each subject, to obtain a Pearson correlation coefficient matrix COR between the time series of the brain regions;

a dynamic time warping step: calculating a dynamic time warping (DTW) distance of the time series of every two brain regions for each subject, to obtain an original DTW distance matrix;

a matrix conversion step: performing corresponding conversion on the DTW distance matrix obtained by the dynamic time warping step in combination with the Pearson correlation coefficient matrix calculated by the Pearson correlation coefficient calculation step for each subject, to obtain a converted DTW' matrix which includes correlation degree and correlation direction information and whose numerical range is equivalent to a value range of the Pearson coefficient;

wherein the matrix conversion step comprises the following substeps:

a first conversion substep: inverting the DTW distance matrix to obtain a DTW inverse matrix, that is, a DTW_OP matrix;

a normalization substep: performing normal distribution fitting on the DTW_OP matrix to obtain means and standard deviations of normal distribution, and performing a normalization operation on each value in the DTW_OP matrix to obtain a DTW normalization matrix, that is, a DTW_NORM matrix;

a second conversion substep: converting all negative numbers in the DTW_NORM matrix to 0 to obtain a DTW matrix without negative numbers, that is, a DTW_POS matrix;

a third conversion substep: multiplying the values of corresponding positions in the DTW_POS matrix by 1 or −1 according to the positive or negative values in the Pearson correlation coefficient matrix to obtain the DTW' matrix; and a matrix combination step: performing weighted combination on the Pearson correlation coefficient matrix COR and the DTW' matrix for each subject to obtain a functional connectivity matrix FC, wherein a combination mode of the weighted combination is FC=COR+ δDTW', where δ is a weight coefficient; and a disease prediction result is obtained through the functional connectivity matrix FC.

2. The disease prediction method based on a multi-relation functional connectivity matrix according to claim 1, wherein the brain image atlas in the brain region time series extraction step comprises a brain anatomy atlas, a brain functional atlas and a multi-modal brain atlas.

3. The disease prediction method based on a multi-relation functional connectivity matrix according to claim 1, wherein in the DTW' matrix, the positive and negative values respectively indicate correlation directions of two corresponding brain regions.

4. The disease prediction method based on a multi-relation functional connectivity matrix according to claim 1, wherein in the matrix combination step, after the functional connectivity matrix FC is obtained, the functional connectivity matrix FC is input as a feature into a machine learning model or a deep learning model for disease prediction.

5. A computer program product comprising a non-transitory computer readable medium having instructions recorded thereon, the instructions when executed by a computer implementing the method of claim 1.

* * * * *